Figure 1:
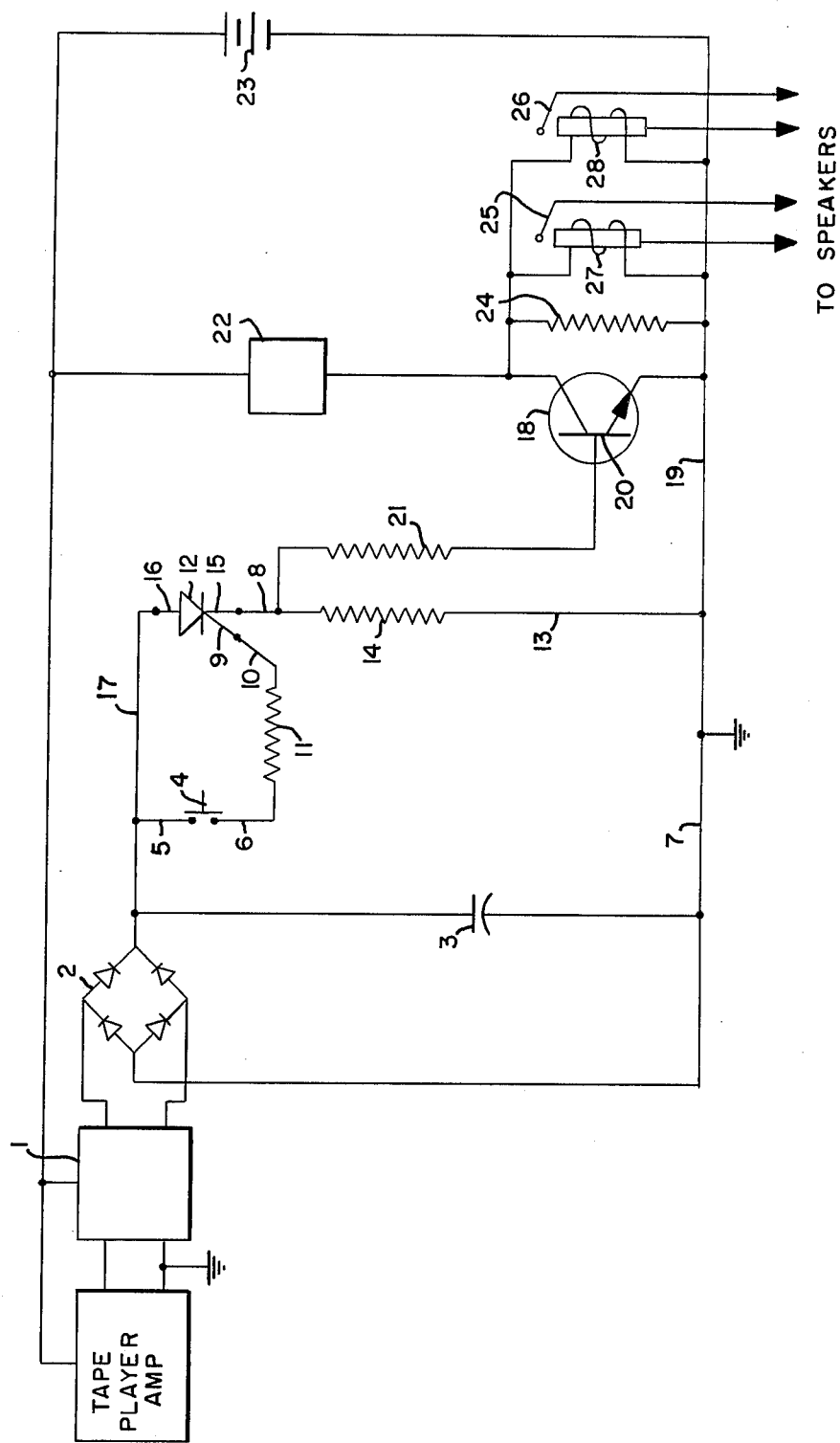

United States Patent [19]

Jordan

[11] 4,027,336
[45] May 31, 1977

[54] MOTOR SPEED CONTROL DEVICE

[76] Inventor: Rodney Bryant Jordan, Rte. 2, Box 43, Florien, La. 71429

[22] Filed: Mar. 13, 1975

[21] Appl. No.: 558,056

[52] U.S. Cl. .................................................. 360/73
[51] Int. Cl.² ......................................... G11B 15/46
[58] Field of Search ...................... 360/73; 318/311

[56] References Cited

UNITED STATES PATENTS

| 3,505,485 | 4/1970 | Andrews | 360/73 |
| 3,673,351 | 6/1972 | Niioka et al. | 360/73 |

*Primary Examiner*—Robert S. Tupper
*Attorney, Agent, or Firm*—Roy, Kiesel, Patterson, Hudson & Abadie

[57] ABSTRACT

A control for speeding up a motor upon a given occurrence and automatically slowing the motor to its normal speed upon a second occurrence.

2 Claims, 1 Drawing Figure

MOTOR SPEED CONTROL DEVICE

BACKGROUND OF THE INVENTION

1. Field of the Invention

This invention relates broadly to speed control of electric motors, and more particularly to a device for speeding up a motor run by direct current upon a given occurrence and returning it automatically to its normal speed upon a second occurrence.

2. Prior Art

Various circuitry and controls have been devised for controlling motor speed. Examples of such can be seen in U.S. Pat. No. 3,617,844 entitled "Controlled Velocity Drive" by James W. Grygua, U.S. Pat. No. 3,841,238 entitled "Vehicle Traction Systems" by Michael Ainley Thompson, et al, U.S. Pat. No. 3,447,055 entitled "D.C. Motor Speed Control Circuit" by R. J. Mason, U.S. Pat. No. 3,736,481 entitled "Adjustable Speed Motor Control System" by Ernest F. W. Alexanderson, U.S. Pat. No. 3,849,710 entitled "Motor Speed Control Circuit" by Raymond J. Mason, and U.S. Pat. No. 3,805,136 entitled "Electric Hair Clipper with Permanent Magnet Motor" by Roy E. Meyer, et al.

None of the prior art has directed itself toward a control system that will speed up a motor upon one occurrence and then automatically return the motor to its normal speed upon a different occurrence. One area in which such a device is most needed is in the tape deck (i.e., cassette or reel-to-reel tape players). Most of the commercial musical cassettes and tapes played on these devices contain certain songs which the listener does not wish to hear. Presently, there is no convenient way to by-pass the undesired song to listen to a more desired song. This problem is particularly acute in the car tape deck players where one must drive while trying to change songs.

SUMMARY OF THE INVENTION

Therefore, it is an object of this invention to provide a control for speeding up a motor upon an occurrence and automatically returning the motor to normal speed upon a second occurrence.

Another object of this invention is to provide a control for tape deck and reel-to-reel tape players that allow for by-passing a single song and automatically beginning on a subsequent song.

These and other objects and advantages of this invention will become apparent from the ensuing descriptions of this invention.

Accordingly, a control is provided comprising a signal detection means, a means for converting a signal detected to direct electric current, a current-receiving means having a receiver for receiving the direct current, the receiver when receiving the direct current allowing other direct current from the conversion means to pass through the current-receiving means even when the direct current to the receiver has stopped, a switching device that allows passage of electric current from a power source to the motor when current is flowing through the SCR, where the current that passes through the switching device to the motor and where the switching device is opened and allows only the normal current to get to the motor when no current is passing through the SCR.

BRIEF DESCRIPTION OF THE INVENTION

FIG. 1 is a schematic diagram of one embodiment of this invention utilizing a tape deck player motor arrangement.

PREFERRED EMBODIMENTS OF THE INVENTION

For purposes of illustration and clarity only this invention will be described utilizing a tape player motor arrangement.

In a typical commercial musical tape to be played in a tape player, there will be a series of different songs recorded. When the music is being played, an alternating current (A.C.) voltage varying from 20 to 20,000 cycles per second is produced. At the end of one song, and before the beginning of the next song there is usually a period of at least several seconds when no voltage is produced. Referring now to FIG. 1, this voltage can be fed into a high impedance amplifier 1. Switch 4 is pressed to pulse the gate 9 of SCR 12 as explained more fully below.

From the high impedance amplifier 1, the current passes through a bridge rectifier system 2 in order to transform the A.C. to pulsating D.C. This pulsating D.C. is then converted to pure D.C. by filter capacitor 3.

Now, when switch 4 is pressed to complete the circuit between wire 5 and 6, current passes through wires 7, 8, SCR gate 9, and wire 10 to a resistor 11. This resistor regulates the amount of current that will be transmitted to gate 9 of SCR 12. Once gate 9 has been pulsed, then D.C. current from bridge rectifier 2 passes through wire 7, wire 13, resistor 14, cathode 15 of SCR 12 and to anode 16 of SCR 12, and back through wire 17 to bridge rectifier 2. The SCR is such a device that even when switch 4 is released thus breaking the circuit to the gate, current will continue to flow from SCR cathode 15 to SCR anode 16 until the current through wire 17 is broken. This will occur only when the break between songs occurs. Therefore, as long as a song is playing, current flows through SCR 12, and resistor 14.

As current flows through resistor 14 a voltage appears across resistor 14. Since resistor 14 is connected in parallel with a transistor switching device 18, a base current will flow through wire 19, the base-emitter junction 20 of transistor switching device 18, and resistor 21 (used to control the amount of current passing through the base-emitter junction 20). This base current causes the collector-emitter resistance of the transistor switch 18 to drop from near infinity to near zero. When this happens (e.g., during the playing of a song on the tape), current can flow across transistor 18 to tape player motor 22 as more fully explained below.

According to this invention, it is necessary to have a power supply 23 connected to motor 22 through transistor switch device 18 wherein the current generated by power supply 23 and fed into motor 23 along with any other current is greater than that normally used by motor 22. The increase in the current will then cause the motor 22 to run faster. Thus in the case illustrated, once current is allowed to flow through transistor switch device 18 the song being played will be speeded up, and when the song stops the current to motor 22 will return to normal and the next song will be played at normal speed since no current will flow across transistor switch device 18 (i.e., the voltage across resistor 14 has been reduced to zero since no current is flowing through SCR 12).

In a preferred feature, it is desirable that the tape player speakers be disengaged during the fast playing of the song. One means to accomplish this is illustrated in the circuit of FIG. 1. Power supply 23 is connected to motor 22 through a parallel network of transistor switch device 18, resistor 24 and speaker relay coils 27 and 28 of speaker relays 25 and 26 which are connected to the tape players speakers. When transistor switch device 18 is open (i.e., no fast speed desired) current generated by power supply 23 passes through resistor 24 and the coils 27 and 28, respectively, of speaker relays 25 and 26. The size of the resistor is set to allow passage of only the normal amount of motor current. Also, at this time, audio current is allowed to pass to the speakers through relays 25 and 26 permitting the listener to hear the music being played. Now when the transistor switch device 18 is closed (i.e., fast speed desired) all of the current flows through transistor switch device 18 to motor 22 because this is the path of least resistance. Since no current flows to speaker relay coils 27 and 28 of speaker relays 25 and 26 neither of the speakers emit any sound.

There are, of course, many alternate circuits and devices that could be employed depending upon the nature of the equipment. For example, instead of an SCR, the circuitry could be slightly modified so one could use a silicon controlled switch (SCS) or a Triac, and instead of a transistor switch one could use a field effect transistor (FET), relay or vacuum tube. Other obvious changes would include the use of a simple half wave rectifier rather than a bridge rectifier if a sensitive SCR and switching circuit or a higher output high impedence amp were used.

What I claim as new, novel, useful and unobvious, and desire United States Letters Patent is:

1. For use in a tape player having an amplifier which produces current only during the playing of a recorded message on tape a motor, a first power source which under normal playing conditions provides a pre-determined amount of current to said amplifier and to said motor to reel a tape through said tape player and wherein said motor reels said tape at a faster speed upon receiving additional current, a device for selectively fast reeling said tape by supplying said motor with additional current, comprising:
   a. rectifier means for receiving said amplifier current and converting said current to direct current;
   b. a switching means;
   c. a transistor switching means;
   d. a second power source;
   e. a silicon controlled rectifier, said switching means connected in series to said rectifier means and to said silicon controlled rectifier's gate, said switching means being momentarily activated when it is desired to increase said motor's speed, said silicon controlled rectifier having an anode connected to said rectifier means and a cathode connected to said transistor switching means, said current flows between said cathode and anode after current has passed through said base and until said amplifier stops producing current, said transistor switching means having a base connected to said cathode, a collector connected to said motor and an emitter connected to said second power source, said transmitter switch means allowing current from said second power source to pass to said motor only when current flows from said cathode to said anode.

2. A device according to claim 1 wherein a resistor is connected in parallel with said transistor switch means to said first power source and said motor, said first and second power sources being one and the same, said first power source being capable of providing more than said predetermined amount of current when said current does not flow through said transistor.

* * * * *